United States Patent
Geiger

[11] Patent Number: 6,154,010
[45] Date of Patent: Nov. 28, 2000

[54] BATTERY CHARGING DOCKING CRADLE FOR A MOBILE COMPUTER

[75] Inventor: Avi R. Geiger, Claremont, Calif.

[73] Assignee: Microsoft Corporation, Redmond, Wash.

[21] Appl. No.: 09/196,385

[22] Filed: Nov. 19, 1998

[51] Int. Cl.$^7$ .................................. H02J 7/00; H02J 7/04
[52] U.S. Cl. ........................................... 320/137; 320/139
[58] Field of Search ..................................... 320/114, 115, 320/145, 137, 139

[56] References Cited

U.S. PATENT DOCUMENTS

| | | | |
|---|---|---|---|
| 5,125,077 | 6/1992 | Hall | 709/203 |
| 5,646,507 | 7/1997 | Timmons et al. | 320/109 |
| 5,666,006 | 9/1997 | Townsley et al. | 320/124 |
| 5,666,491 | 9/1997 | Harris, Jr. et al. | 710/62 |
| 5,684,382 | 11/1997 | Fritz et al. | 320/164 |
| 5,694,023 | 12/1997 | Podrazhansky et al. | 320/145 |
| 5,710,911 | 1/1998 | Walsh | 713/500 |
| 5,739,665 | 4/1998 | Bares | 320/115 |
| 5,744,935 | 4/1998 | Khoury | 320/107 |
| 5,982,643 | 11/1999 | Phlipot | 320/149 |

OTHER PUBLICATIONS

T.R. Crompton, "Battery Reference Book," pp v–vi, 1/3–1/9, 2/14–2/23, 6/3–6/5, 21/3, 31/3–31/19, 53/6–53/11, Butterworths, 1990.

BTI Battery Technologies, Inc., "HTTP://www.bti.ca," 1996–98, World Wide Web Aug. 17, 1998.

Robert A. Powers, "Batteries for Low Power Electronics," Proc. of the IEEE, vol. 83, No. 4, Apr. 1995.

Hewlett Packard, HP 620LX/660LX Palmtop User Guide, Notice, pp vii–x, 1–40, Edition 1, May 1998.

Hewlett Packard, "HTTP://www.hp.com/handheld/palmtops/product_info/600addon.htm," 1996–98, World Wide Web.

Casio, "HTTP://www.Casio–usa.com/e10," 1998, World Wide Web.

Philips Electronics, "HTTP://nino.philips.com/accessories/index.html," 1998, World Wide Web.

Philips Electronics, "Nino 300 Personal Companion," 1998.

Philips Electronics, "HTTP://nino.philips.com/store/products/nino320.html," 1998, World Wide Web.

Philips Electronics, "HTTP://nino.philips.com/accessories/nino301.html," 1998, World Wide Web.

Michael J. Riezenman, "The Search for Better Batteries," IEEE Spectrum, May 1995.

*Primary Examiner*—Peter S. Wong
*Assistant Examiner*—Pia Tibbits
*Attorney, Agent, or Firm*—Klarquist, Sparkman, Campbell, Leigh & Whinston, LLP

[57] ABSTRACT

The present invention charges rechargeable alkaline batteries installed in a mobile computer. According to the invention, a mobile computer holds one or more rechargeable alkaline batteries. These batteries are charged when the mobile computer is placed in a specially designed device that is attached to an external power supply and attachable to a second computer for communicating with said second computer. Charging circuitry regulates the charging of the rechargeable alkaline batteries held by the mobile computer or a selector manually manipulable by a user could choose the recharging mode.

22 Claims, 4 Drawing Sheets

BATTERY CHARGING DOCKING CRADLE FOR A MOBILE COMPUTER

FIELD OF THE INVENTION

This invention relates generally to a device for charging rechargeable alkaline batteries held in a mobile computer while the mobile computer is connected to a docking cradle.

BACKGROUND OF THE INVENTION

Computers have dramatically decreased in size in the past decade, enabling the production of powerful mobile computers. The popularity of mobile computers is due largely to their portability. This obvious advantage is counterbalanced by the difficulty of providing a long-lasting and portable power source for mobile computers.

For many uses of mobile computers, it is necessary or desirable to provide a long-lasting supply of power. For example, in performing extensive fieldwork away from external sources of power, it is desirable to have a long-lasting, portable source of power. Electrochemical batteries are desirably used as a long-lasting and portable power source for mobile computers.

When using battery power, it is necessary or desirable to minimize total costs. The two main classes of batteries are primary (non-rechargeable) batteries and secondary (rechargeable) batteries. When selecting among types of primary batteries, one must consider the cost of the batteries and how long the batteries last, among other questions. When selecting among types of rechargeable batteries, one must also consider how many times the batteries can be recharged, how long it takes to recharge the batteries, how long a charge lasts, and memory effects of the batteries, among other questions.

Many mobile computers have addressed these concerns by having a rechargeable and long-lasting, but expensive power source. For example, the Hewlett Packard 620LX uses lithium ion batteries. Lithium ion batteries have a long shelf life, long operating life, high energy density, and good recharge characteristics. Moreover, lithium ion batteries can be fully recharged quickly, often within two hours.

This typical practice of using rechargeable lithium ion batteries in a mobile computer has several drawbacks. Lithium ion batteries are expensive and often must be purchased as product-specific components from the manufacturer of the mobile computer. Moreover, chargers for lithium ion batteries, for example "smart charger" chips, are complex because strict control of charge and discharge is required for both safety and long cycle life. The circuitry for these chargers is relatively expensive and bulky compared to other recharging technologies. Finally, capacity loss through self-discharge for lithium ion batteries is relatively high, about 8% per month.

Other electronic devices may use rechargeable nickel-cadmium or nickel metal hydride batteries. For example, the Philips 300 series provides an optional rechargeable nickel metal hydride battery pack. Nickel metal hydride batteries are rechargeable and offer a slightly cheaper alternative to lithium ion batteries. Other advantages of include the ability to deliver high current in short periods and the ability to deliver relatively constant levels of current.

The disadvantages of nickel cadmium batteries include pronounced memory effect and other cyclic loss of capacity, high capacity loss through self-discharge, relatively low energy density, and environmental problems related to the cadmium. Compared to nickel cadmium batteries, nickel metal hydride batteries have less memory effect and no environmental problems, but have worse capacity loss through self-discharge.

Some mobile computers, for example the Casio Cassiopeia E-10, use primary (non-rechargeable) batteries, including non-rechargeable alkaline manganese, lithium, nickel cadmium, and nickel metal hydride batteries. Alkaline manganese batteries, for example, have long operating life, long shelf life, and relatively high energy density. Moreover, primary alkaline batteries are widely available for purchase and come in standard sizes. Compared to other battery types, primary alkaline batteries are inexpensive.

The chief drawback to using primary batteries in mobile computers is that primary batteries are not safely rechargeable. To some extent, this drawback of primary alkaline batteries is offset by low replacement cost and ease of replacement. Nevertheless, mobile computers that consume power at a high discharge rate have frequently chosen rechargeable lithium ion, nickel cadmium, or nickel-metal hydride batteries over quickly consumed alkaline batteries.

Rechargeable alkaline batteries, such as RAM cells from Battery Technologies Inc., are increasingly used in mobile electronic devices. Rechargeable alkaline batteries offer the advantageous usage characteristics of primary alkaline batteries including high energy density and low cost, and also are rechargeable. Rechargeable alkaline batteries are desirably fully recharged, or "topped off," on a frequent basis. Conversely, deep discharge of rechargeable alkaline batteries is desirably avoided. Rechargeable alkaline batteries can be charged by constant voltage taper charging or by pulse charging. In constant voltage taper charging, a voltage regulator, maintaining constant voltage in a circuit to a rechargeable alkaline battery, supplies current that trickles off as the battery becomes charged and voltage in the battery increases. For example, a 3.3 constant voltage regulator may be used to taper charge a pair of 1.5 volt rechargeable alkaline batteries by supplying current that "trickles off" as the batteries become charged. For optimal charging of deeply discharged alkaline batteries, constant voltage taper charging requires 10 to 12 hours of charging, and is desirably done overnight. In pulse charging, a "smart" charger containing microchip controllers safely sends pulses of power to a rechargeable alkaline battery at voltages much higher than the voltages in taper charging. For this reason, pulse charging requires less time than constant voltage taper charging. Finally, compared to other rechargeable batteries, rechargeable alkaline batteries have a relatively low capacity loss through self discharge, about 0.5% per month.

Rechargeable batteries are charged using a battery charging mechanism including some combination of a power supply, charging circuitry, and batteries. Charging circuitry may be packaged with the batteries in a special battery pack, or included in a separate battery charging device. A battery charging mechanism is desirably implemented with small, inexpensive circuitry. Further, a battery charging mechanism is desirably implemented in a way that is consistent with the form of the mobile computer and the way the mobile computer is used, simplifying both production and use.

In mobile computers, existing battery charging mechanisms for lithium ion, nickel, and rechargeable alkaline batteries come in a variety of forms. In some mobile computers, charging circuitry is located within the mobile computer for charging batteries within the computer, either as part of a battery pack or as separate circuitry within the computer. In other mobile computers, the charging circuitry is located within an external battery charger for charging batteries outside of the computer.

Implementing an efficient battery charging mechanism within the existing use patterns of a mobile computer has been difficult, especially considering the challenge of fitting charging circuitry within increasingly small mobile computers. For example, the inconvenience of having to remove batteries discourages optimal charging of rechargeable batteries in an external battery charger. At the same time, however, the size of charging circuitry makes it non-optimal to locate it within small mobile computers for in-device charging. Limited space is desirably used for increased battery storage or other uses. Even if charging circuitry is placed within a mobile computer, attaching an AC adapter to the mobile computer for the sole purpose of charging constitutes an inconvenient step. Further, placing circuitry within a mobile computer for in-device charging hampers efforts to market accessories for mobile computers because the charging feature may not be wanted by all users.

To conserve limited battery life, mobile computers typically offer AC adapters that provide direct current to a mobile computer from an external power source. An AC adapter bypasses the battery system, conserving battery life. In addition, an AC adapter may be used to supply power to charge rechargeable batteries. An AC adapter may be plugged directly into the mobile computer or into a docking cradle for the mobile computer. The chief drawback of AC adapters is that their use is limited to areas with available external power sources. Although an AC adapter effectively conserves battery power, it hinders full utilization of the portability of mobile computers.

A docking cradle is a device that allows a mobile computer to communicate with a second computer, usually a desktop computer, when the mobile computer is connected to ("docked" at) the docking cradle. As is known in the art, a docking cradle is interchangeably referred to as a "docking station" or "cradle." In many mobile computers, an AC adapter plugged into the docking cradle powers the mobile computer while the mobile computer communicates with a second computer.

SUMMARY OF THE INVENTION

The present invention charges rechargeable alkaline batteries installed in a mobile computer. According to the invention, a mobile computer holds one or more rechargeable alkaline batteries. These batteries are charged when the mobile computer is placed in a specially designed device that is attached to an external power supply and attachable to a second computer for communicating with said second computer. Charging circuitry regulates the charging of the rechargeable alkaline batteries held by the mobile computer.

In an illustrated embodiment of the present invention, a docking cradle has a receptacle shaped to receive and support the mobile computer, and has a data communication connector. The mobile computer is equipped with a counterpart data communication connector, and docks into the receptacle with the docking cradle and mobile computer's connectors matingly engaged. The docking cradle is attached via a power cable to an external power supply. The docking cradle contains a static voltage regulator that produces a constant voltage taper charging current. Both communications with the mobile computer and the charging current are transmitted through the engaged connectors while the mobile computer is docked in the docking cradle. Accordingly, while the mobile computer is docked at the docking cradle to exchange or synchronize data with the desktop computer, the rechargeable alkaline batteries of the mobile computer also are charged.

This accomplishes more effective mobile computer battery recharging because it is done on a more regular basis, i.e. when the mobile computer is docked for either charging or communication with the desktop computer. Moreover, for a mobile computer typically left in its docking cradle overnight, charging occurs within the existing use patterns of the mobile computer and does not inconvenience the user. Moreover, while the mobile computer rests in the docking station overnight, rechargeable alkaline batteries are optimally "topped off," and less likely to become deeply discharged. Charging occurs within the existing form factor of the mobile computer. Further, the charging circuitry is contained within the docking cradle and power is transferred through the cradle connector, so no changes are required to the standard shape of the mobile computer. In addition, a user does not need to connect a separate power cable for charging, which some users may neglect to do because of the inconvenience of separately connecting the cable. Finally, because the charging feature is packaged in a docking cradle accessory, the feature is sold only to consumers who desire the feature, expediting the process of marketing and "accessorizing" for the mobile computer.

The present invention overcomes many of the drawbacks associated with prior art mechanisms. Rechargeable alkaline batteries are inexpensive and widely available, overcoming the problems of expensive, product-specific lithium ion batteries and expensive nickel cadmium and nickel-metal hydride batteries. By using an inexpensive and simple constant voltage regulator in the charging process, the problems associated with placing expensive and bulky charging circuitry in a mobile computer are overcome. Providing charging circuitry in the docking cradle saves crucial space in the mobile computer.

The recharging circuitry of the present invention fits within the docking cradle, not the mobile computer, yet the recharging takes place while the batteries remain installed within the mobile computer. In contrast, typical existing battery technology charges batteries in place inside a mobile computer using circuitry located inside the mobile computer or outside a mobile computer using circuitry located outside the mobile computer. The recharging mechanism of the present invention works optimally within the use parameters of a mobile computer that is regularly placed in a docking cradle to synchronize data with a desktop computer. Moreover, because the circuitry is placed within the docking cradle, the standard form of the mobile computer need not be altered and the charging feature is expeditiously packaged as an upgrade or accessory.

Additional features and advantages of the invention will be made apparent from the following detailed description of an illustrated embodiment that proceeds with reference to the accompanying drawings.

DETAILED DESCRIPTION OF THE ILLUSTRATED EMBODIMENTS

Figure 1:
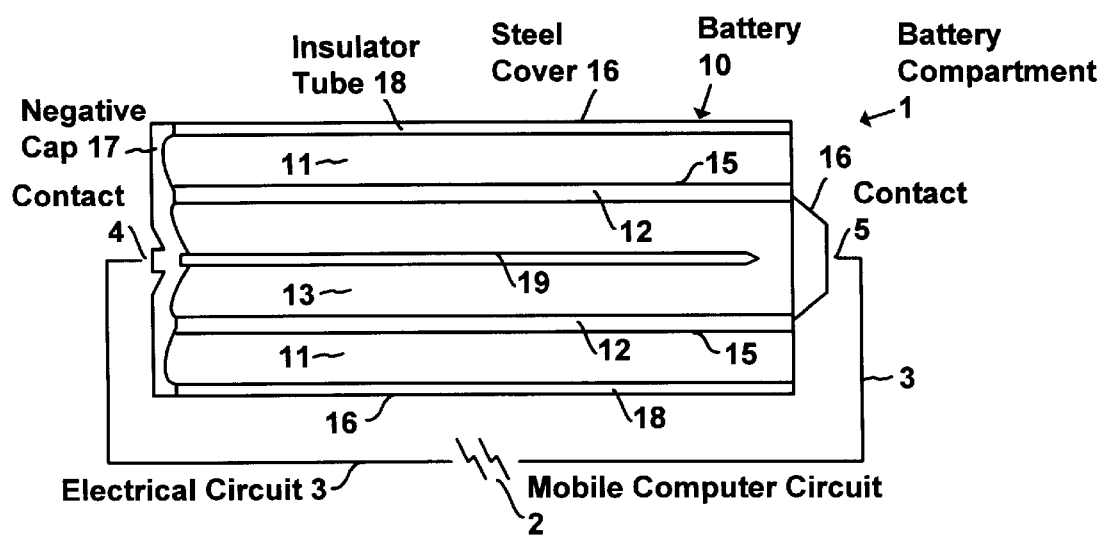
FIG. 1 is a schematic diagram of a rechargeable alkaline battery installed in the battery compartment of a mobile computer.

Referring to FIG. 1, a mobile computer battery compartment 1 holds a rechargeable alkaline battery 10 ["battery 10"] that is charged according to the illustrated embodiment of the present invention. The rechargeable alkaline battery 10 discharges to supply electrical current to mobile computer circuit 2 through electrical circuit 3, and is charged by electrical current from an external source applied to the battery 10 through electrical circuit 3. In conventional battery terminology, the mobile computer circuit 2 is a load on the battery 10 that uses the electrical current discharged by the battery 10. The mobile computer circuit 2 is of conventional design such as that known in the art.

As is known in the art, the mobile computer battery compartment 1 could hold more than one rechargeable alkaline battery for charging without departing from the principles of the present invention. For example, the Casio Cassiopeia E-10 palm size personal computer may hold two 1.5 volt rechargeable alkaline batteries. For the sake of clarity of presentation, FIGS. 1–4 and accompanying description illustrate a single rechargeable alkaline battery 10.

As is known in the art, the term "cell" refers to an electrochemical energy storage device consisting of two electrodes, an electrolyte, and (usually) a separator. The term battery refers to one or more cells connected to form a single unit. Because the battery of the illustrated embodiment of the present invention is a single-cell battery, the terms battery and cell are used interchangeably to refer to an electrochemical energy storage device consisting of two electrodes, an electrolyte, and a separator contained in a single unit. Alternatively, a battery with different configurations of cells may be used.

Referring again to FIG. 1, discharged electrical current flows from the battery 10 to the mobile computer circuit 2 and back to the battery 10 through electrical circuit 3. As described later, the battery terminal contacts 4 and 5 at the ends of electrical circuit 3 contact the battery 10 to conduct electrical current in the discharge and charge operations of the present invention.

As is well known in the art, a battery generates electrical current by means of electrical potential between two dissimilar electrodes in contact with a conducting material, often an electrolytic solution. Each of the two dissimilar electrodes has an electrical potential difference with the conducting material. The total electrical potential of the battery is the sum of the electrical potentials of the electrodes with the conducting material. For a general description of battery technologies, and rechargeable manganese alkaline batteries in particular, see T. R. Crompton, Battery Reference Book, 1990 edition.

Specifically, as is known in the art, in a typical rechargeable alkaline battery 10, a manganese dioxide electrode 11 and a zinc electrode 13 are in contact with a separator 15 that has been soaked in an electrolytic solution 12 of potassium hydroxide. The electrolytic solution of potassium hydroxide 12 also permeates the manganese dioxide electrode 11. The separator 15 separates the two electrodes 11 and 13 to prevent contact between the two electrodes that could short circuit the battery 10. Electrical current is transmitted from the battery 10 to the battery terminal contacts 4 and 5 through the negative cap 17 and the steel cover 16, respectively. The steel cover 16 covers the outside of the battery 10 and contacts the battery terminal contact 5. The steel cover 16 also contacts the manganese dioxide electrode 11 at the top of the battery 10, and is separated from the manganese dioxide electrode 11 through the rest of the battery 10 by the insulator tube 18. The negative cap 17 contacts the battery terminal contact 4. The negative cap 17 also contacts the current collector nail 19 within the zinc electrode 13. Having generally described the structure of a typical rechargeable alkaline battery 10, the discharge and charge operations of the battery 10 are now described in some detail.

An electrical potential exists between the zinc electrode 13 and the electrolytic solution 12 such that the zinc electrode 13 yields positive ions to the electrolytic solution 12, resulting in a negatively charged zinc anode 13. An electrical potential exists between the manganese dioxide electrode 11 and the electrolytic solution 12 such that the electrolytic solution 12 yields positive ions to the manganese dioxide electrode 11, resulting in a positively charged manganese dioxide cathode 11. In this charged state with a zinc anode 13 and a manganese dioxide cathode 11, the total electrical potential is the sum of the electrical potentials between the two electrodes and the electrolytic solution. For example, there is a total electrical potential of approximately 1.5 volts in a size AAA rechargeable alkaline battery.

During discharge of battery 10, an electrical circuit 3 is formed between the battery 10 and the mobile computer circuit 2 in which negative charge stored in the zinc anode 13 of the battery 10 is discharged. Electrical circuit 3 transfers electrons from the zinc anode 13 that were collected by the current collector 19, and then transferred through the negative cap 17 and battery terminal contact 4. This discharge gradually depletes the negatively charged zinc anode 13 in an oxidation reaction, as the zinc becomes uncharged zinc oxide. At the same time, after flowing through the mobile computer circuit 2, electrons reach the charged manganese dioxide cathode 11 through the steel cover 16 contacting the battery terminal contact 5 of electrical circuit 3. The charged manganese dioxide cathode 11 is gradually depleted in a reduction reaction, as positively charged manganese dioxide becomes uncharged manganese oxyhydroxide. Overall, as electrons are discharged through electrical circuit 3 for use by the mobile computer circuit 2 and positive ions are transferred between the zinc anode 13 and the manganese dioxide cathode 11 by the electrolytic solution 12, the negatively charged zinc anode 13 becomes uncharged zinc oxide and the positively charged manganese dioxide becomes uncharged manganese oxyhydroxide, and the electrical potential of the charged battery is gradually diminished.

During charging of the battery 10, a direct electrical current from an external source is applied through the electrical circuit 3 in a reverse direction from the discharge operation. Electrons are transferred to the zinc electrode 13 through the battery terminal contact 4, the negative cap 17, and the current collector 19. At the same time, the electrolytic solution 12 yields positive ions attracted to the zinc electrode 13. The zinc oxide of the zinc electrode 13 undergoes a reduction reaction wherein it becomes zinc, gradually becoming a negatively charged zinc anode again. In the manganese electrode 11, manganese oxyhydroxide yields positive ions to the electrolytic solution and manganese oxyhydroxide is reformed in an oxidation reaction into manganese dioxide, gradually restoring the positively charged manganese dioxide cathode 11. After the zinc oxide is fully reformed into zinc in the zinc anode 13 and the manganese oxyhydroxide is fully reformed into manganese dioxide in the manganese dioxide cathode 11, the electrical potential of the battery 10 is restored and the direct electrical current from the external source is stopped.

Rechargeable alkaline batteries are inexpensive to produce. As is known in the art, they can be manufactured in ways similar to the manufacture of primary alkaline batteries. Moreover, rechargeable alkaline batteries exhibit low capacity loss, about 0.5% per month, have a favorable discharge pattern, and can be effectively recharged approximately 25 times from deep discharge. Rechargeable alkaline batteries also display high energy capacity. For these reasons, rechargeable alkaline batteries are a suitable source of power for a mobile computer docked in a docking cradle for charging.

The charging of rechargeable alkaline batteries in the illustrated embodiment of the present invention is complicated by two problems associated with manganese alkaline batteries. First, if manganese alkaline batteries are overcharged, the manganese dioxide may undergo further oxidation into higher oxides, resulting in degradation of recharging capacity. Second, charge current passed to the battery from an external source after the electrodes have reached their fully charged state causes electrolysis of the electrolyte. Electrolysis results in a buildup of internal pressure and may cause the battery to burst, ruining the battery and possibly damaging the mobile computer.

As is known in the art, the problems of overcharging rechargeable alkaline batteries can be overcome by means of controlled charging methods including pulse charging and constant voltage taper charging.

As is known in the art, pulse ("smart") chargers use a microchip to deliver controlled pulses of current during a charging operation. A typical mechanism for pulse charging rechargeable alkaline batteries is Rayovac Corporation's Renewal™ system. This system sends pulses of electrical current to a cell to be charged at fixed intervals and measures the "resistance-free" cell voltage between pulses. If the "resistance-free" cell voltage is less than a specified cut-off voltage, a full pulse of current is sent. When the "resistance-free" cell voltage does not exceed the specified cut-off voltage, a charge pulse is sent whose driving voltage is much higher than the specified cut-off voltage, and whose charge current is higher, making fast charging possible. When the "resistance-free" cell voltage is greater than the specified cut-off voltage, the battery is fully charged and charging stops. Although pulse chargers can recharge a battery more quickly than constant voltage taper chargers, they require more expensive and bulky circuitry, and hence are not ideally located inside a mobile computer.

Figure 2:
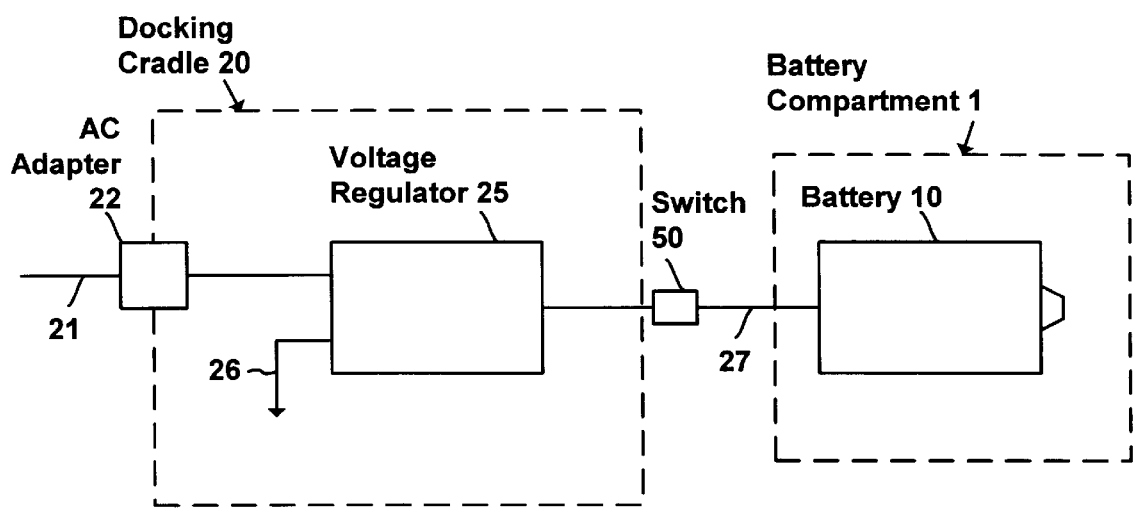
FIG. 2 is a block diagram of a constant voltage taper charging mechanism for charging a rechargeable alkaline battery.

Referring to FIG. 2, the constant voltage taper charging mechanism of the illustrated embodiment of the present invention is described in some detail. As is known in the art, in this method of constant voltage taper charging, a constant voltage current is applied to battery 10. At the start, when the battery 10 is discharged, the voltage of the battery 10 is lowest and the applied current is highest. As the battery 10 charges, the voltage within the battery 10 increases and the applied current "trickles off," regulated by a voltage regulator 25, to maintain a constant voltage.

Direct current 21 is supplied from a standard external power source to docking cradle 20 through AC adapter port 22. Direct current 21 is supplied to the voltage regulator 25. The voltage regulator 25 is a standard static voltage regulator with a cut-off voltage suitable for taper charging rechargeable alkaline battery 10 in battery compartment 1.

Alternatively, voltage regulator 25 may be a dynamic voltage regulator set to the suitable cut-off voltage. A line 26 from the voltage regulator 25 is set to ground. As is known to those of skill in the art, the voltages of the direct current 21 and the voltage regulator 25 suit the particular rechargeable batteries used. For example, the Casio Cassiopeia E-10 may use a pair of 1.5 volt rechargeable alkaline batteries, each with an optimal voltage on charge of approximately 1.65 volts. To recharge these two batteries optimally, the direct current 21 is a 5 volt current and the voltage regulator 25 is a 3.3 volt static voltage regulator.

The voltage regulator 25 supplies regulated direct current 27 to the battery compartment 1. The battery compartment 1 uses regulated direct current 27 to taper charge rechargeable alkaline battery 10, as described above. As regulated by voltage regulator 25, regulated direct current 27 is strongest as the rechargeable alkaline battery 10 is initially charged from a discharged state. Regulated direct current 27 trickles off as the voltage maximum is reached. In this manner, the rechargeable alkaline battery 10 is quickly charged to near-full capacity, then slowly and safely topped off to full capacity.

Although slower than pulse charging, constant voltage taper charging is simpler and less expensive. Moreover, constant voltage taper charging is ideally suited for non-time critical charging applications like overnight charging of rechargeable alkaline batteries in a mobile computer docked in a docking cradle.

As is known in the art, the charging circuitry in the docking cradle 20 could be circuitry other than the voltage regulator 25. For example, pulse charging circuitry for rechargeable alkaline batteries could be located within docking cradle 20 to recharge batteries in a battery compartment 1 without departing from the principles of the present invention.

Figure 3:
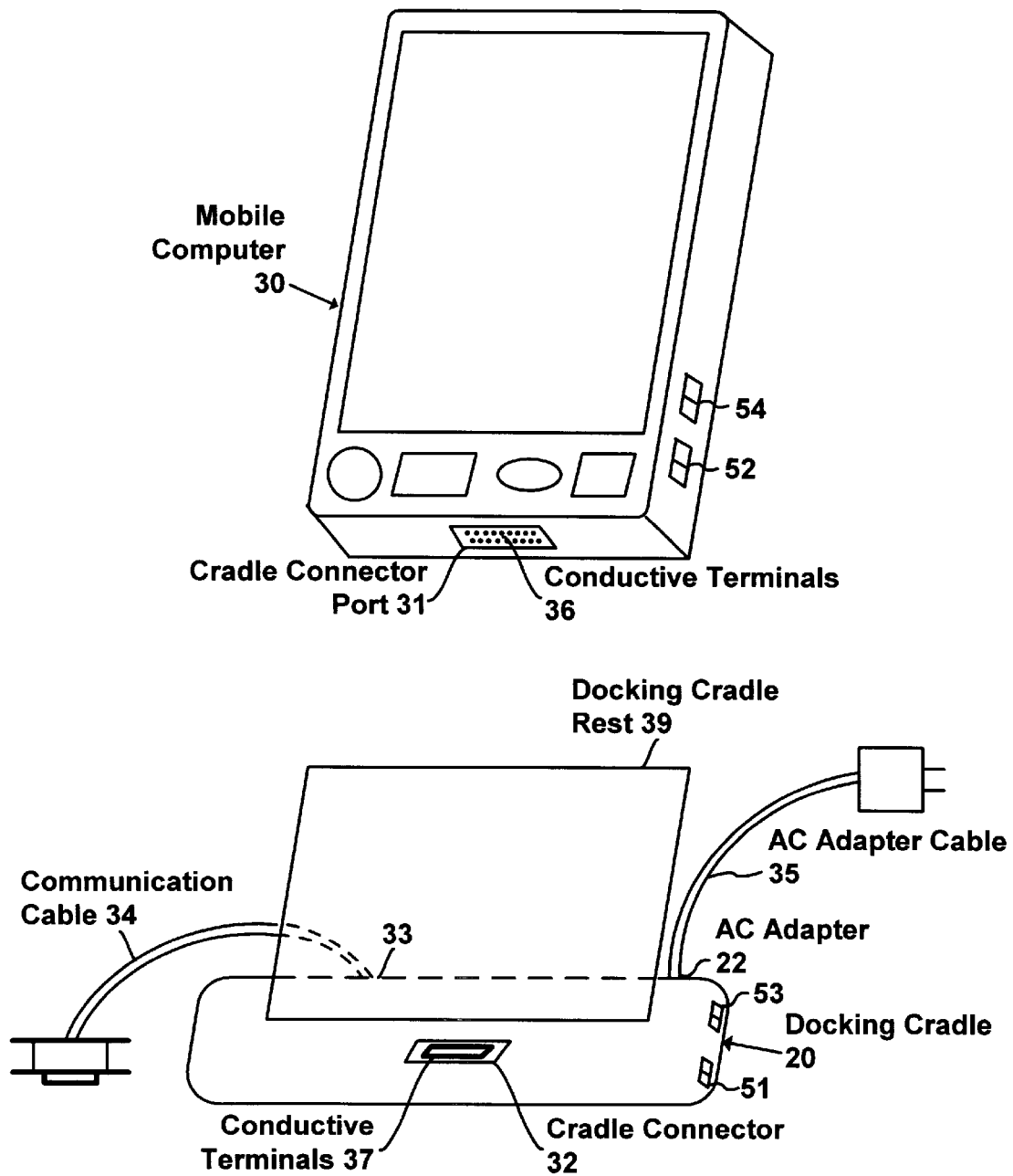
FIG. 3 is a perspective view of a docking cradle containing the charging mechanism of FIG. 2, a mobile computer holding rechargeable alkaline batteries, a power cable, and a communications cable.

Referring to FIG. 3, the two principle components of the illustrated embodiment of the present invention are a docking cradle 20 and a mobile computer 30.

As shown in FIG. 3, the docking cradle 20 includes the AC adapter connector 22, the voltage regulator 25, electrical currents 21 and 27, and ground line 26. The docking cradle 20 further includes a communications port 33 for communicating with another computer. A communication cable 34 attaches to the docking cradle 20 at the communication port 33, and to another computer. In an alternative embodiment, the communication cable 34 is permanently attached to the docking cradle 20 at the communication port 33. For example, in the Casio Cassiopeia E-10, the communication cable 34 is a serial cable permanently attached to the docking cradle for connection to a RS232C serial interface of another computer. An AC adapter cable 35 attaches AC adapter connector 22 to an external power source. The AC adapter cable 35 includes an AC/DC converter for converting alternating current from the external power source to a suitable voltage direct current for the mobile computer 30. For example, in the Casio Cassiopeia E-10, the AC adapter cable 35 supplies 5 volt direct current to the docking cradle 20 through AC adapter connector 22. Alternatively, the AC/DC converter could be located within the docking cradle. For supporting the mobile computer 30, the docking cradle 20 includes a rest 39. The docking cradle 20 includes a cradle connector 32. As is known in the art, the cradle connector 32 comprises plural conductive terminals 37 embedded in an arm protruding from the docking cradle 20 for inserting into the mobile computer 30. As is known in the art, the term "pin" is used interchangeably with the term "conductive terminal." As described in detail below, the docking cradle 20 transmits communications and electrical current for charging through the conductive terminals 37 of the cradle connector 32 to the mobile computer 30.

As described in FIG. 1, the mobile computer 30 includes the battery compartment 1 and uses the rechargeable alkaline battery 10. As is known in the art, the mobile computer 30 includes a cradle connector port 31 for receiving the cradle connector 32 of the docking cradle 20 when the mobile computer 30 is docked at docking cradle 20. The cradle connector port 31 comprises plural conductive terminals 36 embedded in a cavity of the mobile computer 30. The conductive terminals 36 of the cradle connector port 31 correspond to the conductive terminals 37 of the cradle connector 32. As the cradle connector 32 of the docking cradle 20 inserts into the cradle connector port 31 of the mobile computer 30, the conductive terminals 37 of the cradle connector 32 make electrical contact with the corresponding conductive terminals 36 in the cradle connector port 31, electrically connecting the docking cradle 20 and the mobile computer 30, as is known in the art. Power and communications are transmitted from the docking cradle 20 to the mobile computer 30 through the conductive terminals 36 of the cradle connector port 31. In other respects, the mobile computer 30 is a portable computer of familiar design in the art.

Figure 4:
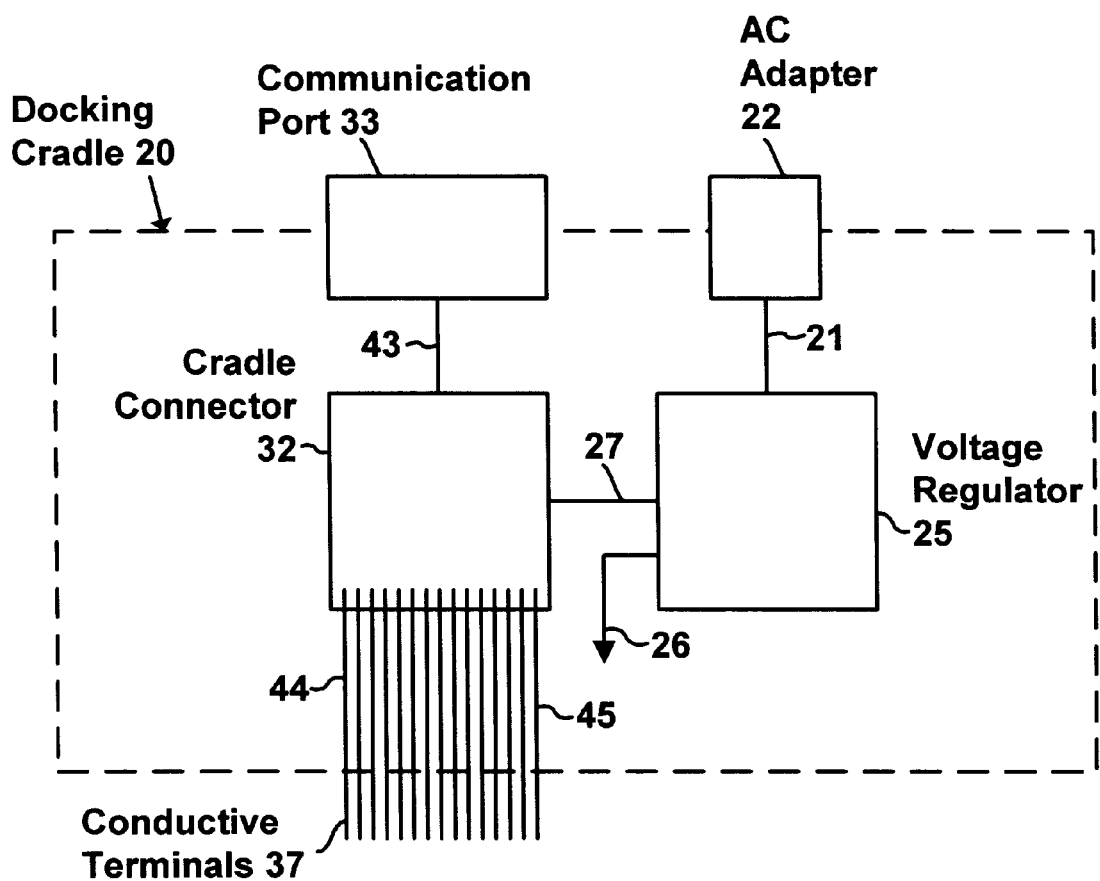
FIG. 4 is a block diagram of a docking cradle illustrating an AC adapter port for receiving power, a serial port for receiving communications, a voltage regulator, and a cradle connector for supplying power to and communicating with a mobile computer.

Referring to FIG. 4, the details of the docking cradle 20 are described.

As described in FIGS. 2 and 3, the docking cradle 20 includes the AC adapter connector 22, the voltage regulator 25, electrical currents 21 and 27, and ground line 26. The AC adapter connector 22 receives DC input from AC adapter 35. The direct current 21 is supplied to voltage regulator 25. The voltage regulator 25 is grounded by ground line 26. Regulated direct current 27 is supplied by the voltage regulator 25 to the cradle connector 32. The docking cradle 20 includes the communication port 33 that is used to send and receive communications from another computer. Through any of various methods known in the art, the communication port 33 is electrically connected to the cradle connector 32 through one or more communication lines 43. Cradle connector 32 receives regulated direct current 27 from the voltage regulator 25, and receives and transmits communications from communication line 43 to communication port 33.

The cradle connector 32 transmits power for charging, and receives and transmits communications to mobile computer 30 through the plural conductive terminals 37. The conductive terminal 44 is one of the plural conductive terminals 37. The conductive terminal 44 is used to transmit power for charging from regulated direct current 27 to mobile computer 30. As described above, the conductive terminal 44 of the cradle connector 32 electrically contacts a corresponding conductive terminal in the plural conductive terminals 36 in the cradle connector port 31 of the mobile computer 30. For example, in the Casio Cassiopeia E-10, pin 2 of the cradle connector is operable to transmit power from the docking cradle to a corresponding pin in the Casio Cassiopeia E-10's cradle connector port for the purpose of charging rechargeable alkaline batteries. In an alternative embodiment, more than one conductive terminal of the plural conductive terminals 37 is used to transmit power to corresponding conductive terminals in the plural conductive terminals 36 in the cradle connector port 31 of the mobile computer 30. For example, in the Casio Cassiopeia E-10, pins 2 and 18 of the cradle connector may be used to transmit power from the docking cradle to the Casio Cassiopeia E-10 for the purpose of charging rechargeable alkaline batteries.

The conductive terminal 45 is one of the plural conductive terminals 37. The conductive terminal 45 is used to receive and transmit communications from the communication line 43 to the mobile computer 30. As described above, conductive terminal 45 of the cradle connector 32 electrically contacts a corresponding conductive terminal in the plural conductive terminals 36 in the cradle connector port 31 of the mobile computer 30. In an alternative embodiment, more than one conductive terminal of the plural conductive terminals 37 is used to receive and transmit communications to corresponding conductive terminals in the plural conductive terminals 36 in the cradle connector port 31 of the mobile computer 30. The other conductive terminals of the plural conductive terminals 37 may be used for other purposes, for example, providing power to run the mobile computer 30.

In an alternative embodiment of the present invention, the mobile computer has a non-rechargeable mode in which non-rechargeable batteries are used, and a rechargeable mode in which the rechargeable batteries are used and charged. The user selects between rechargeable and non-rechargeable modes by, for example, operating a selector switch (FIG. 2, selector switch 50) on either the docking cradle in (FIG. 3, selector switch 51) or the mobile computer in FIG. 3 selector switch 52) which selectively opens or closes the circuit from the recharging circuit to the battery.

In an alternative embodiment of the present invention, multiple types of charging circuitry are used, with the user selecting which type of charging circuitry to use. For example, in one alternative embodiment, a pulse charging circuit for pulse charging the rechargeable batteries is contained within the docking cradle and a voltage regulator is contained within the mobile computer. In another alternative embodiment, a pulse charging circuit and a voltage regulator are contained within the docking cradle. The user selects between charging modes by, for example, operating a selector switch on either the docking cradle (in FIG. 3, selector switch 53) or the mobile computer (In FIG. 3, selector switch 54) which selectively connects one or the other charging circuit with the battery while the mobile computer is placed in the cradle.

Having described and illustrated the principles of my invention with reference to an illustrated embodiment, it will be recognized that the illustrated embodiment can be modified in arrangement and detail without departing from such principles. It should be understood that the devices and methods described herein are not related or limited to any particular type of computer apparatus or circuitry, unless indicated otherwise. Various types of general purpose or specialized computer apparatus or circuitry may be used with or perform operations in accordance with the teachings described herein.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. An apparatus for charging one or more rechargeable alkaline batteries located in a mobile computer, the apparatus comprising:
   a docking cradle for the mobile computer, the docking cradle including:
      a connector for receiving electrical power from an external source;

a port for communicating with a second computer;

a cradle connector for communicating with the mobile computer and supplying a charging current, said cradle connector comprising an arm protruding from the docking cradle for both of said communicating with the mobile computer and said supplying; and a charging circuit powered by the electrical power and supplying the charging current to the cradle connector;

a power cable for supplying the electrical power to the docking cradle; and a communication cable for communicating with the second computer.

2. The apparatus of claim 1 wherein the cradle connector is operable to supply charging current to the mobile computer while transmitting communications between the mobile computer and the second computer, the communications including synchronization of data.

3. The apparatus of claim 2 wherein the cradle connector includes plural pins, wherein the charging current is supplied through at least one of the plural pins, and wherein communications are transmitted through at least one of the plural pins.

4. The apparatus of claim 1 wherein the charging circuit is a 3.3 volt voltage regulator for voltage taper charging.

5. The apparatus of claim 1 wherein the charging circuit is a pulse charging circuit for pulse charging.

6. The apparatus of claim 1 wherein the cradle connector includes plural pins, and wherein the charging current is supplied through at least one of the plural pins.

7. The apparatus of claim 1 wherein the communication cable is permanently attached to the port for communicating.

8. The apparatus of claim 1 wherein the apparatus has a non-rechargeable mode in which the one or more rechargeable alkaline batteries are not charged while the mobile computer is in the docking cradle, and a rechargeable mode in which the one or more rechargeable alkaline batteries are charged while the mobile computer is in the docking cradle, and wherein the apparatus includes a selector manipulable by a user to select a mode.

9. The apparatus of claim 1 wherein the charging circuit is a pulse charging circuit, the apparatus further comprising:

a voltage regulator located within the mobile computer, wherein the apparatus has a pulse recharging mode in which the one or more rechargeable alkaline batteries are charged using the pulse recharging circuit, and a voltage taper recharging mode in which the one or more rechargeable alkaline batteries are charged using the voltage regulator; and a selector manipulable by a user to select a recharging mode.

10. The apparatus of claim 1 wherein the charging circuit is a pulse charging circuit, the apparatus further comprising:

a voltage regulator located within the docking cradle, wherein the apparatus has a pulse recharging mode in which the one or more rechargeable alkaline batteries are charged using the pulse recharging circuit, and a voltage taper recharging mode in which the one or more rechargeable alkaline batteries are charged using the voltage regulator; and a selector manipulable by a user to select a recharging mode.

11. An apparatus for charging one or more rechargeable alkaline batteries located in a mobile computer, the apparatus comprising:

a docking cradle for the mobile computer, wherein the docking cradle includes:

an AC adapter connector for receiving electrical power from an external source;

a voltage regulator for constant voltage taper charging the one or more rechargeable alkaline batteries;

a data communications port for communicating with a second computer; and a cradle connector for supplying a charging current to the mobile computer through a first cradle connector port of the mobile computer and transmitting communications between the second computer and the mobile computer through the first cradle connector port, the cradle connector including a grouping of plural pins, wherein the cradle connector supplies the charging current to the mobile computer through at least one of the grouping of plural pins, and wherein the cradle connector transmits communications through at least one of the grouping of plural pins;

an AC adapter cable for attaching the AC adapter connector of the docking cradle to an AC power source; and a serial port interface cable for attaching the data communications port of the docking cradle to an data communications port of the second computer.

12. The apparatus of claim 11 wherein the cradle connector is operable to supply the charging current to the mobile computer while transmitting communications between the mobile computer and the second computer, the communications including synchronization of data.

13. The apparatus of claim 11 wherein the apparatus has a non-rechargeable mode in which the one or more rechargeable alkaline batteries are not charged while the mobile computer is in the docking cradle, and a rechargeable mode in which the one or more rechargeable alkaline batteries are charged while the mobile computer is in the docking cradle, and wherein the apparatus includes a selector manipulable by a user to select a mode.

14. A method for upgrading a mobile computer to charge one or more rechargeable batteries while the mobile computer is located in a cradle; wherein the mobile computer otherwise uses one or more non-rechargeable batteries; wherein the cradle includes a cradle connector for inserting into the mobile computer, the cradle connector comprising plural pins embedded in an arm protruding from the cradle, at least one of the plural pins for transmitting communications to and receiving communications from the mobile computer, and at least one of the plural pins unused by the cradle; and wherein the mobile computer includes a cradle connector port for receiving the cradle connector, the cradle connector port comprising plural pins embedded in a cavity in the mobile computer, at least one of the plural pins for transmitting communications to and receiving communications from the cradle, and at least one of the plural pins unused by the mobile computer, the method comprising:

providing a charging circuit;

connecting at least one unused pin of the cradle connector port to an electrical circuit in contact with the one or more rechargeable batteries in the mobile computer;

connecting at least one unused pin of the cradle connector to at least one pin of the cradle connector port connected to the electrical circuit;

transmitting a charging current to the mobile computer through at least one of the unused pins of the cradle connector;

charging the one or more rechargeable batteries held in the mobile computer.

15. The method of claim 14 wherein the cradle connector transmits the charging current to the mobile computer while transmitting communications to and receiving communications from the mobile computer, the communications including synchronization of data.

16. The method of claim 14 wherein the charging circuit is contained within the cradle.

17. The method of claim 14 wherein the charging circuit is contained within the mobile computer.

18. The method of claim 14 wherein the mobile computer has a non-rechargeable mode in which the one or more rechargeable batteries are not charged while the mobile computer is in the cradle, and a rechargeable mode in which the one or more rechargeable batteries are charged while the mobile computer is in the cradle; and wherein the mode is selectable by a user.

19. The method of claim 14 wherein the charging circuit is a pulse charging circuit located within the cradle, the method further comprising:

providing a voltage regulator located within the mobile computer, wherein the mobile computer has a pulse recharging mode in which the one or more rechargeable batteries are charged using the pulse recharging circuit, and a voltage taper recharging mode in which the one or more rechargeable batteries are charged using the voltage regulator; and wherein the recharging mode is selectable by a user.

20. The method of claim 14 wherein the charging circuit is a pulse charging circuit located within the cradle, the method further comprising:

providing a voltage regulator located within the cradle, wherein the mobile computer has a pulse recharging mode in which the one or more rechargeable batteries are charged using the pulse recharging circuit, and a voltage taper recharging mode in which the one or more rechargeable batteries are charged using the voltage regulator; and wherein the recharging mode is selectable by a user.

21. A method for charging one or more rechargeable alkaline batteries held in a mobile computer, the method comprising:

providing a docking cradle for the mobile computer, wherein the docking cradle is attached to an external power source, wherein the docking cradle includes a cradle connector for communicating with and supplying a charging current to the mobile computer through a first cradle connector port of the mobile computer, and wherein the docking cradle includes a recharging circuit;

docking the mobile computer in the docking cradle;

supplying the charging current to the mobile computer through the cradle connector; and charging the one or more rechargeable alkaline batteries held in the mobile computer.

22. The method of claim 21 further comprising:

establishing a communication link between the mobile computer and a second computer through the docking cradle; and communicating between the mobile computer and the second computer through the cradle connector, wherein the communication includes synchronization of data.

* * * * *

UNITED STATES PATENT AND TRADEMARK OFFICE
CERTIFICATE OF CORRECTION

| | |
|---|---|
| PATENT NO. | : 6,154,010 |
| DATED | : November 28, 2000 |
| INVENTOR(S) | : Avi R. Geiger |

It is certified that error appears in the above-identified patent and that said Letters Patent is hereby corrected as shown below:

<u>Column 12,</u>
Line 22, "an data" should be -- a data --.

Signed and Sealed this

Fifth Day of March, 2002

Attest:

Attesting Officer

JAMES E. ROGAN
*Director of the United States Patent and Trademark Office*